April 27, 1948. L. E. SIMMONS 2,440,304
CLUTCH AND BRAKE CONTROL
Filed April 9, 1943

Inventor:
Leon E. Simmons.
by Louis A. Maxson
atty.

Patented Apr. 27, 1948

2,440,304

UNITED STATES PATENT OFFICE 2,440,304

CLUTCH AND BRAKE CONTROL

Leon E. Simmons, Claremont, N. H., assignor to Joy Manufacturing Company, a corporation of Pennsylvania Application April 9, 1943, Serial No. 482,401

8 Claims. (Cl. 192—18)

This invention relates to control mechanisms and more particularly to improvements in a control mechanism for a clutch and brake mechanism. The control mechanism is embodied in the transmission mechanism of a coal mining machine.

An object of the present invention is to provide an improved control mechanism for a clutch and brake mechanism. Another object is to provide an improved clutch and brake mechanism having improved operating means whereby when the clutch is applied the brake is released and vice versa, and having associated therewith improved means for adjusting elements of the operating means. Another object is to provide an improved clutch and brake mechanism having novel features of construction. A further object is to provide an improved overload release device associated with a clutch and brake mechanism whereby in the event the brake accidentally binds or jams while the clutch is applied, overload of the parts of the associated transmission means is precluded. Still another object is to provide an improved shipper mechanism for a clutch and a brake whereby the brake applying element may remain stationary, so far as rotation is concerned, while the clutch element is freely rotatable, there being arranged an antifriction thrust bearing between said relatively rotatable elements. A further object is to provide an improved operating means for a frictional controlling device whereby an operating element of the device is adjustable to take up undesirable slack or lost motion. A still further object is to provide an improved control mechanism embodied in the transmission mechanism of a coal mining machine. Yet another object is to provide an improved feeding means for a coal mining machine embodying an improved control mechanism. These and other objects and advantages of the invention will, however, hereinafter more fully appear.

In the accompanying drawing there is shown for purposes of illustration one form which the invention may assume in practice.

Figure 1:
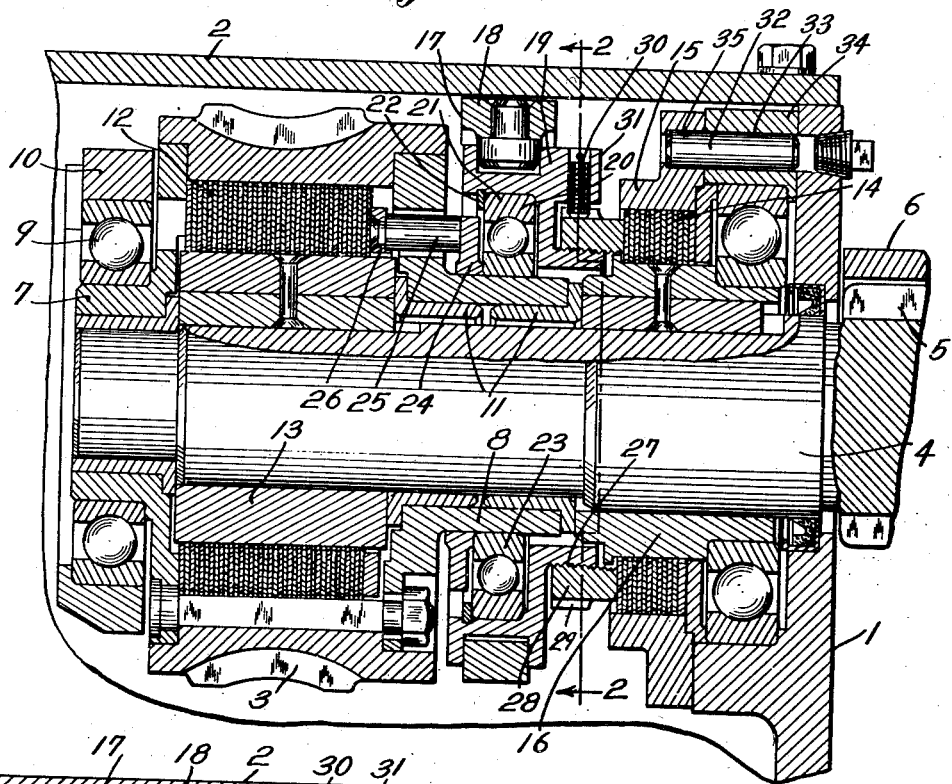
Fig. 1 is a vertical sectional view taken through a portion of a transmission mechanism embodying an illustrative form of the invention.
Figure 2:
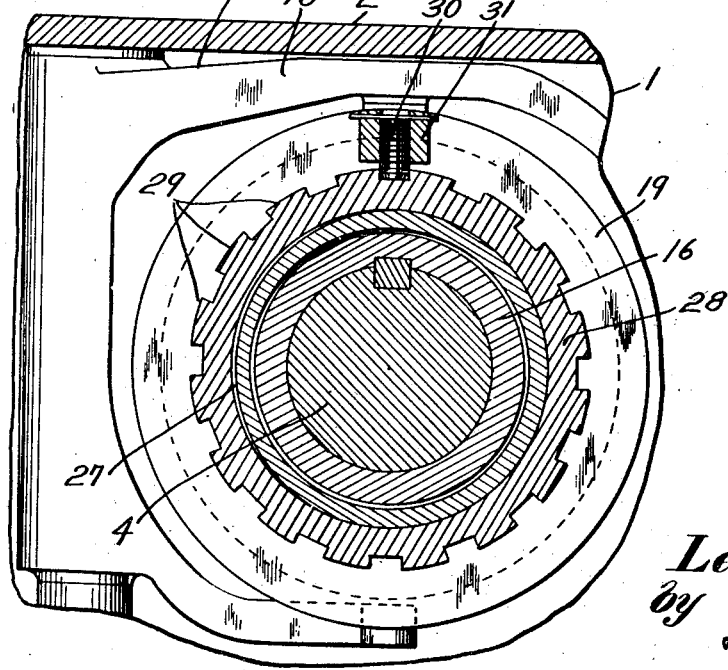
Fig. 2 is a cross sectional view taken substantially on line 2—2 of Fig. 1.

In this illustrative embodiment of the invention, the improved control mechanism is shown incorporated in a transmission mechanism of the feeding means of a coal mining machine of the flexibly fed, shortwall, floor cutter type. It will be understood, however, that the invention may be advantageously employed in other types of mechanisms.

In this illustrative construction, there is shown a casing 1 having a detachable cover plate 2 and housing a transmission mechanism including a worm wheel 3, a driven shaft 4, a spur gear 5 and an internal gear 6, the latter being suitably operatively connected to an element to be driven. The worm wheel 3 has oppositely projecting cylindric hubs 7 and 8, and the hub 7 is journaled in a ball bearing 9 supported within a suitable bracket 10 within the transmission casing. The other hub 8 of the worm wheel is journaled on bearing sleeves 11 supported by the shaft 4. The shaft 4 is connectible to the worm wheel for driving thereby by a conventional disc clutch 12 comprising clutch plates interlocked with projections on the worm wheel and interleaved with clutch discs interlocked with projections on a sleeve 13 keyed to the shaft 4. Coaxial with the disc clutch 12 is a conventional disc brake 14 comprising brake discs interlocked with projections on an annular member 15 and interleaved with brake discs interlocked with projections on a sleeve 16 keyed to the shaft 4. The annular member 15 is normally rigidly held against rotative movement with respect to the casing 1. Shipper mechanism 17 having any suitable operating means, is provided for controlling the clutch 12 and brake 14. When the clutch is applied and the brake is released, the shaft 4 may be driven by the worm wheel 3 and when the clutch is released and the brake is applied, rotation of the shaft may be frictionally resisted.

In transmissions of the above character, it has been found that, due to wear or other reasons, the shipper mechanism must at times be adusted to take up undesirable slack or lost motion. It has also been found that in the event the brake is jammed or otherwise held against release, the shaft would lock so that when the clutch was held applied, parts of the associated transmission mechanism would become overloaded and frequently some damage would result if some overload release device was not provided. The present invention as hereinafter pointed out overcomes these obvious objectionable features.

The improved adjustable shipper mechanism of the present invention, comprises a swingable shipper yoke 18 engaging a normally non-rotating collared sleeve 19 arranged intermediate the clutch and brake and surrounding the shaft 4 in the manner shown. Interposed between the collared sleeve 19 and the adjacent hub 8 of the worm wheel, and surrounding the hub, is a ball thrust bearing 20 having an outer ball race 21 tightly held as by a split ring 22, against bodily movement with respect to the shipper sleeve 19. An inner ball race 23 is slidably mounted on the worm wheel hub 8 and engages a rotatable pressure ring 24 also slidably mounted on the worm wheel hub. This pressure ring engages projections 25 fixed to a pressure plate 26, the latter engaging the adjacent rotatable end disc of the clutch. Threadedly connected at 27 to the shipper sleeve 19 is an adjustable collar 28 which engages the adjacent non-rotatable end disc of the brake. The collar 28 may be adjusted relative to the shipper sleeve 19 to vary the distance of the points of engagement of the shipper mechanism with the clutch and brake, thereby to enable the taking up of undesirable wear or lost motion. The adjustable collar 28 is formed with toothlike projections or serrations 29 about its exterior periphery, and a set screw 30 threadedly secured within a projecting lug 31 on the shipper sleeve 19 is adapted to project between a mutually adjacent pair of projections or teeth 29 to lock the collar 28 in adjusted position with respect to the shipper sleeve. The provision of the ball thrust bearing 20 permits relative rotation between the pressure ring 24 and the collar 28, thereby enabling the part which engages the brake to be non-rotatable while the part engaging the clutch may freely rotate. As shown, the collar 28 is definitely non-rotatable only during brake application, but, if desired, any suitable means coacting with the lug 31, e. g. projections from the cover 2 or from the annular member 15, could be provided to hold the sleeve 19 against rotation.

To overcome the possibility of inadvertent jamming or binding of the brake so that shaft rotation is unduly resisted when the clutch is applied, the annular member 15 of the brake may be mounted so as to be capable of rotation but be normally held against rotation with respect to the casing 1 by a shear pin 32. This shear pin is fixed to a bore 33 formed in a support 34 fixed to the casing and projecting within an alined bore 35 in the annular member 15. In the event the shaft 4 is undesirably frictionally resisted by the brake when the clutch is applied and becomes excessively overloaded the shear pin shears off or fractures, allowing the annular member 15 of the brake freely to rotate, thereby rendering the brake ineffective, and, as a result, preventing breakage of the parts of the associated transmission mechanism.

It is accordingly evident that by the provision of the novel adjustable shipper means of the present invention, embodying the adjustable collar and the relatively rotatable parts respectively engaging the clutch and brake, it is possible readily to adjust the distance between the points of engagement of the shipper mechanism with the clutch and brake to take up wear and to eliminate the possibility of any drag. It will also be evident that by the provision of the relatively simple shear pin structure associated with the brake, an overload release is provided which prevents the possibility of breakage of parts of the associated transmission mechanism in the event of accidental jamming or binding of the brake while the clutch is concurrently loaded. Other uses and advantages of the invention will be clearly apparent to those skilled in the art.

While there is in this application specifically described one form which the invention may assume in practice, it will be understood that this form of the same is shown for purposes of illustration and that the invention may be modified and embodied in various other forms without departing from its spirit or the scope of the appended claims.

What I claim as new and desire to secure by Letters Patent is:

1. In a control mechanism, a clutch and brake mechanism embodying a rotatable clutch and a non-rotatable brake, said clutch and brake being arranged in coaxial spaced apart relation, and shipper means for said clutch and brake arranged intermediate the same and including reciprocable shipper elements, one a clutch operating element and the other a brake operating element, said elements being freely relatively rotatable and mounted to move axially in relatively opposite directions alternately to apply said clutch and brake, a thrust bearing coaxial with and interposed between said shipper elements to permit free relative rotation therebetween, and a shipper member movable between said clutch and brake in opposite directions and associated with said brake operating element for selectively moving said elements into their operating positions, said shipper member effecting movement of said clutch operating element through said thrust bearing and the clutch loading pressures being transmitted directly by said clutch operating element to said clutch.

2. In a control mechanism, a clutch and brake mechanism embodying a rotatable clutch and a non-rotatable brake, said clutch and brake being arranged in coaxial spaced apart relation, and shipper means for said clutch and brake arranged intermediate thereof and including a shipper sleeve, a normally non-rotating element secured to said sleeve for operating said brake, a freely rotatable element for operating said clutch, a thrust bearing disposed coaxially with and between said sleeve and said rotatable element and engageable with the latter for permitting free relative rotation between said elements, and a shipper member movable in opposite directions between said clutch and brake and engaging said sleeve for selectively moving said elements into their operating positions, said shipper sleeve effecting movement of said rotatable element through said thrust bearing and the clutch loading pressures being transmitted directly by said rotatable element to said clutch.

3. In a control mechanism, a clutch and brake mechanism embodying a clutch and a brake, and reciprocable shipper means for said clutch and brake including a clutch operating element and a brake operating element, said elements being freely relatively rotatable and mounted for axial movement in relatively opposite directions to effect direct alternate application of said clutch and brake, and associated means for effecting adjustment of one of said elements axially into a set position relative to the other to vary the distance therebetween, said adjustable one of said elements comprising threadedly connected sleevelike parts which are relatively rotatable to effect such axial adjustment, the adjustable one of said parts having spaced projections about its periphery and said other part having a projecting threaded lug overlying said adjustable part and by which a set screw is carried, said set screw being adjustable into contact with said adjustable part between a mutually adjacent pair of projections thereon to lock said parts against relative rotation.

4. In a control mechanism, a clutch and brake mechanism embodying a clutch and a brake arranged in spaced apart coaxial relation, and reciprocable shipper means for said clutch and brake arranged therebetween including a clutch operating element and a brake operating element, said elements being freely relatively rotatable and mounted for axial movement in relatively opposite directions to effect alternate application of said clutch and brake, a thrust bearing disposed coaxially with and between said elements for permitting free relative rotation therebetween, a shipper member movable in opposite directions between said clutch and brake for moving said elements into their operating positions, said shipper member effecting movement of said clutch operating element through said thrust bearing and the clutch loading pressures being transmitted directly by said clutch operating element to said clutch, and means associated with said shipper member for adjusting one of said elements axially with respect to said other element to vary the distance between the operating portions thereof.

5. In a control mechanism, a clutch and brake mechanism embodying a clutch and a brake arranged in spaced apart coaxial relation, and reciprocable shipper means for said clutch and brake arranged therebetween including a clutch operating element and a brake operating element, said elements being freely relatively rotatable and mounted for axial movement in relatively opposite directions to effect alternate application of said clutch and brake, a thrust bearing disposed coaxially with and between said elements for permitting free relative rotation therebetween, and a manually operable shipper member movable in opposite directions between said clutch and brake for manually moving said elements into their different operating positions, said shipper member effecting movement of said clutch operating element through said thrust bearing and the clutch loading pressures being transmitted directly by said clutch operating element to said clutch.

6. In a control mechanism, a rotatable driving member, a coaxial driven member, a clutch for connecting said driven member to said driving member for driving thereby, a brake for holding said driven member against rotation when said clutch is released, and shipper means for said clutch and brake for alternately applying the same including a freely rotatable clutch operating element mounted for reciprocable movement on said driving member and rotatable therewith, a reciprocable brake operating element which is normally non-rotating and which is always stationary with said brake when the latter is applied, a ball thrust bearing mounted on said driving member intermediate said operating elements and having its inner race engaging said clutch operating element and its outer race engaged by said brake operating element, and a shipper member engaging said brake operating element for selectively moving said operating elements into their operating positions, said clutch being applied by said shipper member through said brake operating element and said thrust bearing and the clutch loading pressures being transmitted directly by said clutch operating element to said clutch.

7. In a control mechanism, a rotatable driving member, a coaxial driven member, a clutch for connecting said driven member to said driving member for driving thereby, a brake for holding said driven member against rotation when said clutch is released, and shipper means for said clutch and brake for alternately applying the same including a freely rotatable clutch operating element mounted for reciprocable movement on said driving member and rotatable therewith, a reciprocable brake operating element which is normally non-rotating and which is always stationary with said brake when the latter is applied, a ball thrust bearing mounted on said driving member intermediate said operating elements and having its inner race engaging said clutch operating element and its outer race engaged by said brake operating element, and a shipper member engaging said brake operating element for selectively moving said operating elements into their operating positions, said clutch being applied by said shipper member through said brake operating element and said thrust bearing and the clutch loading pressures being transmitted directly by said clutch operating element to said clutch, said brake operating element including relatively axially adjustable parts for adjusting said operating elements axially to vary the distance therebetween and interlocking means on said parts for locking said parts in adjusted position.

8. In a control mechanism, a clutch and brake mechanism embodying a clutch and a brake, and reciprocable shipper means for said clutch and brake including a clutch operating element and a brake operating element, said elements being freely relatively rotatable and mounted for axial movement in relatively opposite directions to effect direct alternate application of said clutch and brake, and associated means for effecting adjustment of one of said elements axially into a set position relative to the other to vary the distance therebetween, said adjustable one of said elements comprising threadedly connected sleevelike parts which are relatively rotatable to effect such axial adjustment and an adjustable interlocking connection between said sleevelike parts for locking said parts against relative rotation when in adjusted position.

LEON E. SIMMONS.

REFERENCES CITED

The following references are of record in the file of this patent:

UNITED STATES PATENTS

| Number | Name | Date |
|---|---|---|
| 1,095,094 | Evans | Apr. 28, 1914 |
| 1,118,683 | Rindfleisch | Nov. 24, 1914 |
| 1,386,265 | Linderme | Aug. 2, 1921 |
| 1,528,973 | Groene | Mar. 10, 1925 |
| 1,533,626 | Wilson et al. | Apr. 14, 1925 |
| 1,562,668 | Webb | Nov. 24, 1925 |
| 1,589,903 | Ruggles | June 22, 1926 |
| 1,672,582 | Tenney | June 5, 1928 |
| 1,822,160 | Matthews | Sept. 8, 1931 |
| 1,828,423 | Loeffler | Oct. 20, 1931 |
| 1,991,625 | Peterson | Feb. 19, 1935 |
| 2,008,873 | Nydegger | July 23, 1935 |
| 2,095,094 | Glasner | Oct. 5, 1937 |
| 2,095,816 | Johansen | Oct. 12, 1937 |
| 2,150,867 | Voigt | Mar. 14, 1939 |
| 2,205,989 | Meyers et al. | June 25, 1940 |
| 2,250,981 | Abel | July 29, 1941 |
| 2,376,799 | Miller | May 22, 1945 |

FOREIGN PATENTS

| Number | Country | Date |
|---|---|---|
| 568,494 | France | Nov. 22, 1923 |